United States Patent
Braun et al.

(10) Patent No.: US 6,989,839 B2
(45) Date of Patent: Jan. 24, 2006

(54) METHOD FOR CONVERTING COLOR TO MONOCHROME TO MAINTAIN DIFFERENTIABILITY

(75) Inventors: Karen M. Braun, Fairport, NY (US); Raja Bala, Webster, NY (US)

(73) Assignee: Xerox Corporation, Stamford, CT (US)

( * ) Notice: Subject to any disclaimer, the term of this patent is extended or adjusted under 35 U.S.C. 154(b) by 240 days.

(21) Appl. No.: 10/465,437

(22) Filed: Jun. 19, 2003

(65) Prior Publication Data

US 2004/0257378 A1 Dec. 23, 2004

(51) Int. Cl.
*G09G 5/02* (2006.01)

(52) U.S. Cl. .................. 345/591; 345/589; 345/597; 382/162; 382/167; 358/518

(58) Field of Classification Search ............ 345/427, 345/586, 589–591, 593, 597, 600, 604; 382/162–167, 382/181, 176; 358/1.9, 504, 520, 515, 518; 710/62

See application file for complete search history.

(56) References Cited

U.S. PATENT DOCUMENTS

| 4,308,553 | A | 12/1981 | Roetling ................ 358/75 |
|---|---|---|---|
| 5,153,576 | A | 10/1992 | Harrington ............ 340/793 |
| 5,237,517 | A | 8/1993 | Harrington et al. ...... 364/526 |
| 5,568,248 | A | 10/1996 | Wagley ................ 355/328 |
| 5,648,801 | A | 7/1997 | Beardsley et al. ........ 347/15 |
| 5,670,986 | A | 9/1997 | Leak ................... 345/154 |
| 5,748,798 | A | 5/1998 | Nakai et al. ............ 382/258 |
| 5,778,092 | A | 7/1998 | MacLeod et al. ........ 382/176 |
| 6,198,469 | B1 | 3/2001 | Tjandrasuwita ......... 345/147 |
| 6,252,580 | B1 | 6/2001 | Harrington ............ 345/150 |
| 6,263,101 | B1 * | 7/2001 | Klein ................. 382/162 |
| 6,266,154 | B1 | 7/2001 | Allen .................. 358/1.9 |
| 6,381,036 | B1 * | 4/2002 | Olson ................. 358/1.9 |
| 6,930,690 | B1 * | 8/2005 | Kulkarni .............. 345/589 |
| 2002/0083121 | A1 * | 6/2002 | Chang et al. .......... 709/201 |
| 2002/0099884 | A1 * | 7/2002 | Chang et al. .......... 710/62 |
| 2002/0169805 | A1 * | 11/2002 | Edge .................. 707/528 |
| 2004/0032588 | A1 * | 2/2004 | Taylor et al. .......... 356/402 |

\* cited by examiner

*Primary Examiner*—Kee M. Tung
*Assistant Examiner*—Wesner Sajous

(57) ABSTRACT

What is disclosed is an image processing method for enabling one to print color graphics and other recognizable objects on monochrome printers while retaining color differences. More specifically, the present method is for preserving color discriminability in a grayscale representation. The method involves first sorting colors according to at least one characteristic dimension of a color space such as lightnesses. The color space preferably is a luminance-chrominance color space, although others are envisioned. The sorted colors are adjusted by a metric appropriate to the color space such that the metric imparts a degree of distinction among the colors along the chosen characteristic dimension. The spacing between two adjacent sorted colors can be constant, or weighted by the total color difference between the two colors in the original color space. Color difference can be calculated using for example $\Delta E^*_{ab}$, $\Delta E^*_{LCh}$, $\Delta E^*_{94}$, or DE2000 metrics. Once the colors have been adjusted, they are converted to the monochrome representation using straightforward techniques.

11 Claims, No Drawings

METHOD FOR CONVERTING COLOR TO MONOCHROME TO MAINTAIN DIFFERENTIABILITY

FIELD OF THE INVENTION

The present invention generally relates to the field of color mapping techniques for rendering color images to a monochrome device and, more particularly, to methods for converting colors to a grayscale representation by sorting the colors along the gray dimension in equally spaced or weighted increments.

BACKGROUND OF THE INVENTION

Color is fundamentally a three-dimensional phenomenon described by lightness, chroma, and hue. Colors within graphical objects such as pie charts and bar charts are often chosen for maximum discernability or discriminability. This invention addresses the problem of rendering such objects to a monochrome device. The term "monochrome" refers to a single color of predominantly the same hue or shade. The most common example, and the one used to illustrate the invention, is grayscale. Most often when a pie chart or bar chart is converted from color to grayscale, the lightness information is retained and the chroma and hue information is discarded. In Postscript, for example, the conversion is: GRAY=0.30R+0.59G+0.11B. This conversion is essentially a lightness mapping. Colors with small lightness differences but large hue differences will be indistinguishable in the output even though they were quite distinguishable in the input. In other words, two colors with a large color difference but a small lightness difference will be reproduced similarly while other important information is potentially lost. Other techniques convert color to monochrome by adding texture. This is not always desirable.

U.S. patent application Ser. No. 10/046,399 entitled: "System for, and method of, displaying gray scale images in a display monitor", filed Oct. 29, 2001, now abandoned, provides 3 groups of parallel digital video input signals having a first frequency, each group having 8 binary bits. The parallel signals in each group correspond in gray scale to the signals providing one of the colors in a single color pixel. The parallel signals may have a first particular frequency. The parallel digital signals are serialized at a second frequency constituting an integral multiple (e.g. 3) of the frequency of the parallel signals. The serialized signals are converted in a look-up table to serialized signals having the second frequency. The number of bits in each group of the signals from the look-up table has an arbitrary relationship to the number of the binary bits in each group introduced to the look-up table. For example, the number of binary bits in each group from the look-up table may be ten (10). The signals from the look-up table are converted to analog signals, which produce a gray scale image on a monitor face. The monitor may be a cathode ray tube or a flat panel display. When the monitor is a flat panel display, it is formed without a color filter to increase its light intensity and to provide a gray scale image. The second frequency of the analog signals is increased (as by a FIFO) by a factor (e.g. approximately 25%) to a third frequency to compensate for the absence of a retrace for the signals in the flat panel display. This enhances the image, which is produced on the flat panel display.

U.S. patent application Ser. No. 09/940,358 entitled: "Gray scale scanning method and system", filed Aug. 27, 2001, now allowed, downloads three groups of gamma table data into a color scanner wherein each group of gamma tables includes a plurality of index addresses and each index address corresponds to a storage space. During downloading, the gray scale pixels are scanned to obtain corresponding digital data including brightness of the three primary colors belonging to each gray scale pixel. The brightness and corresponding index address of the three groups of gamma tables are compared to obtain an index address identical to the three primary color brightness values of the gray scale pixels. According to the three index addresses, color space conversion values belonging to the gray scale pixels are obtained. The values are transferred to the host for conducting two add operations so that the gray scale brightness values of the gray scale pixels are found.

U.S. Pat. No. 6,198,469 entitled: "Frame-rate modulation method and apparatus to generate flexible grayscale shading for super twisted nematic displays using stored brightness-level waveforms", by Tjandrasuwita generates gray scale shading data in response to input color data that is cost efficient and programmable is presented. The present invention allows up to 16 brightness-levels to be generated per color (e.g., Red, Green, and Blue). Under the present invention, each color pixel can be programmed to have one of the 16 brightness-level waveforms stored in a memory by dynamically changing a number of variables such as pixel color offsets, frame offset, column offset, row offset, pixel mapping data, etc. An accessing waveform index is generated from the above variables which is then used to select a brightness-level waveform from the memory. The brightness-level waveforms stored in the memory are also programmable.

U.S. Pat. No. 5,670,986 entitled: "Graphics system for displaying images in gray-scale", by Leak, utilizes a lookup table having index values to be stored in a frame buffer. The lookup table is addressed by convening color information, such as RGB color information, to a luminance value, which is then used to access the table. The index values may be used to index a second lookup table for providing luminance information. The present invention further discloses methods of insuring index values provided by the lookup table closely approximate the desired luminance value within the available gray-scale space. Further, the present invention provides methods for performing arithmetic transfer operations on gray-scales represented by indices in the frame buffer.

U.S. Pat. No. 5,648,801 entitled: "Grayscale printing system", by Beardsley et al., scans an image to be printed to produce several bit maps for image pixels having different optical intensities. The different bit maps are handled by a standard print engine separately, in the same manner as multicolor bit maps would be handled. The image is then printed using a print head assembly having separate print heads for grayscale printing using different optical intensities. Thus, a printed image having enhanced resolution and quality, because of the optical intensity discrimination, is produced using a printer architecture which is the same as a standard multicolor printer architecture except for the front end, which scans for optical intensity, and the print head assembly, which has different print heads designed to produce different optical intensities. The print heads use either different ink dot sizes, inks having different pigment concentrations, or other suitable techniques for varying the optical intensity.

U.S. Pat. No. 5,568,248 entitled "Black and white reproducible pattern highlight color printing" by Wagley, discloses a reproduction method comprising printing a physical original document sheet with at least one highlight color area in a highlight color document printer, which highlight color area is a uniformly applied print color area of a color which does not copy well when said document sheet with said highlight color area is copied on a conventional black only reproduction apparatus, and also concurrently printing a black print show-through print repeating pattern superposed under said highlight print color area on said same original document sheet, which black show-through print repeating pattern is highly visible to and reproducible by said conventional black only reproduction apparatus and is not a half-tone pattern, and then copying said original document sheet on a black only reproduction apparatus to generate black print copies in which said highlight color area of said original document sheet contains on said black print copies thereof said highly visible distinguishable black print repeating pattern over said highlight color area which is visually indicative of the original color highlighting of said area.

U.S. Pat. No. 5,153,576 entitled "Mapping of color images to black-and-white textured images" by Harrington discloses mapping an image comprised of a plurality of pixels from color to black-and-white, and includes determining, on a pixel-by-pixel basis, the amount of a plurality of color components in a color image. Each color component is applied to its own halftone screen, each screen being comprised of a plurality of cells. Certain cell areas of each screen having been allocated to a single color component to yield texture patterns. The halftone screens of the color components are combined to yield a black-and-white textured image.

U.S. Pat. No. 6,252,580 entitled "Mapping highlight colors to black-and-white textures" by Harrington describes a method similar to that of U.S. Pat. No. 5,153,576, whereby a pair of color components (namely a highlight component and a base component) targeted for a highlight color device are mapped to black-and-white textures.

U.S. Pat. No. 5,237,517 entitled "Color printing having a highlight color image mapped from a full color image" by Harrington et al. describes a method for converting a full color image, normally comprising three color components, to a highlight color image comprising two color components.

U.S. Pat. No. 4,308,553 entitled "Method and apparatus for making monochrome facsimiles of color images on color displays" by Roetling discloses a method and apparatus for making 35 mm color slides from a color image created on a color cathode ray tube (CRT) terminal. The color terminal transmits commands to a remote central processing unit (CPU) that in turn operates a 35 mm camera device to expose 35 mm color slide film. Prior to transmitting the commands, a black and white facsimile of the color image is created by a graphic printer located at the color terminal. The black and white facsimile uses different halftone dot patterns in a monochrome graphic image to simulate the different colors created at the color terminal. The halftone dot pattern density is related to the luminance of the color it represents and the scale of the dot pattern is large to enable ready detection by the human eye. Also, different dot patterns are used for different colors and on edge enhancement technique is used to distinguish one simulated color region from another in the monochrome image.

What is needed in this art is a technique for converting color to monochrome that retains the discriminability of the original color.

SUMMARY OF THE INVENTION

What is disclosed is an image processing method for enabling one to print color graphics and other recognizable objects on monochrome printers while retaining color differences. More specifically, the present method is for preserving color discriminability in a grayscale representation. The method involves first sorting colors according to at least one characteristic dimension of a color space. The color space preferably is a luminance-chrominance color space, although others are envisioned. For grayscale devices, the characteristic dimension is preferably lightness. The sorted colors are adjusted by a metric appropriate to the color space such that the metric imparts a degree of distinction among the colors along the chosen characteristic dimension. In one embodiment, the metric equally spaces the sorted colors along lightness. In another embodiment, the spacing in lightness between two adjacent sorted colors is weighted by the total color difference between the two colors in the original color space. Color difference can be calculated using for example $\Delta E^*_{ab}$, $\Delta E^*_{94}$, or DE2000 metrics. Once the colors have been adjusted, they are converted to the monochrome representation using straightforward techniques.

DETAILED DESCRIPTION OF THE SPECIFICATION

What is disclosed is a method for converting color graphics to monochrome by adjusting the lightness values. The present invention first sorts the colors of an image's colored items according to their original lightnesses. In the preferred embodiment, the sorted colors are then adjusted to have equal steps in lightness. A conversion to monochrome then produces differentiable patches.

Assuming the N patches are sorted from the darkest (n=1) to the lightest (n=N), the adjusted lightness of patch n is given by:

$$L^*_{n,out} = L^*_{min} + (L^*_{max} - L^*_{min})\frac{n-1}{N-1}$$

where N is the total number of patches, patch n=1 has $L^*=L^*_{min}$, and patch n=N has $L^*=L^*_{max}$.

Alternatively, lightness steps are weighted by the total color difference between each color and the next lighter or darker patch, then:

$$L^*_{n,out} = \begin{cases} L^*_{min} & \text{if } n = 1 \\ L^*_{min} + (L^*_{max} - L^*_{min})\dfrac{\sum_{i=2}^{n} \Delta E_{i,i-1}}{\sum_{i=2}^{N} \Delta E_{i,i-1}} & \text{if } 2 \leq n \leq N \end{cases}$$

where $\Delta E_{i,i-1}$ is the color difference between patches i and i-1. The numerator shows the summation of all the color differences up to the patch of interest and the denominator represents the summation of all the color differences.

The present method can be applied in any luminance-chrominance color space. Although discussed in L*, indicative of CIELAB lightness, HSV or another such space can also be used. In addition, the color difference metric can be any one of a number of available metrics, $\Delta E^*_{ab}$, $\Delta E^*_{94}$, DE2000, or any other metric appropriate to the chosen color space.

The present method extends to converting color images for highlight color printing. Highlight color printers utilize two color components: a highlight color component and a base (usually black) component. The reproducible gamut of such devices is a 2-dimensional plane of lightness-chroma variations, and the output hue is constrained by the chosen highlight color. A conversion from a 3-dimensional input color space to the two-dimensional highlight color space that maintains distinction among image colors can use the same underlying principles as the aforementioned color-to-monochrome transformation. For example, lightness can be selected as the characteristic dimension along which the colors are sorted. The colors can then be adjusted to be equally spaced in lightness values as with the monochrome case. Alternatively, a weighted lightness spacing can be employed, with the weightings between adjacent sorted colors (i.e. $\Delta E_{i,i-1}$ in the previous equation) being based on the 2-D color difference in lightness and hue between original input colors, rather than a 3-D difference involving lightness, chroma, and hue as was done for monochrome. One method of mapping the adjusted 3-D color to the 2-D highlight color space is to respectively reproduce and discard the chroma and hue components of the original color.

It should be understood that the present method is most useful when maximum discriminability among colors in the output is desired, as would be the case for data charts, color-keyed maps (weather maps, elevation or population maps, and the like), and the present method works best when colors are specified as colored patches as in a Postscript file. Print drivers are a logical place for implementation. The present invention is readily extensible to rasters.

In summary, what has been disclosed herein is an image processing method for enabling one to print color graphics and other recognizable objects on monochrome printers while retaining color differences. More specifically, the present method is for preserving color discriminability in a grayscale representation. The method involves first sorting colors according to at least one characteristic dimension of a color space. The color space preferably is a luminance-chrominance color space, although others are envisioned. For grayscale devices, the characteristic dimension is preferably lightnesses. The sorted colors are adjusted by a metric appropriate to the color space such that the metric imparts a degree of distinction among the colors along the chosen characteristic dimension. In one embodiment, the metric equally spaces the sorted colors along lightness. In another embodiment, the spacing in lightness between two adjacent sorted colors is weighted by the total color difference between the two colors in the original color space. Color difference can be calculated using for example $\Delta E^*_{ab}$, $\Delta E^*_{94}$, or DE2000 metrics. Once the colors have been adjusted, they are converted to the monochrome representation using straightforward techniques.

What is claimed is:

1. A method for preserving color discriminability when reproducing an electronic document having areas of color therein using a monochrome device, each color having a predetermined number of dimensional values associated therewith, the predetermined number of dimensional values being equal to a number of dimensions defining a color space, each dimensional value corresponding to a dimension defining the color space, comprising:
   (a) sorting each color to be reproduced according to a dimensional value thereof; and
   (b) adjusting a predetermined number of dimensional values of the sorted colors such that each adjusted dimensional value creates a degree of distinction between the sorted colors when the sorted colors are reproduced by a monochrome device.

2. The method as claimed in claim 1, wherein the color space is a luminance-chrominance space.

3. The method as claimed in claim 1, wherein the predetermined number of dimensional values of the sorted colors are adjusted such that a dimensional difference between each adjacent adjusted dimensional value is equal.

4. The method as claimed in claim 1, wherein the predetermined number of dimensional values of the sorted colors are adjusted such that a dimensional difference between each adjacent adjusted dimensional value is weigthed.

5. The method as claimed in claim 1, wherein the predetermined number of dimensional values of the sorted colors are adjusted such that a dimensional difference between each adjacent adjusted dimensional value corresponds to a color difference between adjacent colors.

6. The method as claimed in claim 3, wherein the color space is a luminance-chrominance space.

7. The method as claimed in claim 4, wherein the color space is a luminance-chrominance space.

8. The method as claimed in claim 5, wherein the color space is a luminance-chrominance space.

9. A method for preserving color discriminability in a grayscale representation when reproducing an electronic document having areas of color therein using a monochrome device, each color having a predetermined number of dimensional values associated therewith, the predetermined number of dimensional values being equal to a number of dimensions defining a color space, each dimensional value corresponding to a dimension defining the color space, one dimension of the color space being associated with lightness, comprising:
   (a) sorting each color to be reproduced according to a lightness value of each color to be reproduced; and
   (b) adjusting the lightness value of a predetermined number of sorted colors such that a lightness difference between each adjacent adjusted lightness value is equal.

10. The method as claimed in claim 9, wherein each lightness value is adjusted according to $$L^*_{n,out} = L^*_{min} + (L^*_{max} - L^*_{min})\frac{n-1}{N-1}$$

wherein $L^*_{n,out}$ is the adjusted lightness value, N is total number of sorted colors, $L^*_{min}$ is a minimum lightness value of the sorted colors, $L^*_{max}$ is a maximum lightness value of the sorted colors, and n is an ordinate number of the lightness value such that the ordinate number of the minimum lightness value is 1 and the ordinate number of the maximum lightness value is N.

11. A method for preserving color discriminability in a grayscale representation when reproducing an electronic document having areas of color therein using a monochrome device, each color having a predetermined number of dimensional values associated therewith, the predetermined number of dimensional values being equal to a number of dimensions defining a color space, each dimensional value corresponding to a dimension defining the color space, one dimension of the color space being associated with lightness, comprising:
   (a) sorting each color to be reproduced according to a lightness value of each color to be reproduced; and
   adjusting the lightness value of a predetermined number of sorted colors such that a lightness difference between each adjacent adjusted lightness value is weighted.

* * * * *